United States Patent [19]

Fuchs et al.

[11] Patent Number: 5,076,929
[45] Date of Patent: Dec. 31, 1991

[54] SEWAGE LAGOON SYSTEM

[76] Inventors: Leonhard Fuchs; Martin Fuchs, both of Im Stocktal 2, D-5440 Mayen 1, Fed. Rep. of Germany

[21] Appl. No.: 493,409

[22] Filed: Mar. 14, 1990

[30] Foreign Application Priority Data

Mar. 17, 1989 [DE] Fed. Rep. of Germany ....... 3908779

[51] Int. Cl.⁵ .............................................. C02F 3/06
[52] U.S. Cl. .................................... 210/615; 210/621; 210/629; 210/903; 210/605
[58] Field of Search ............ 210/150, 151, 194, 195.1, 210/202, 259, 615, 621, 629, 903, 926, 605

[56] References Cited

U.S. PATENT DOCUMENTS

| | | | |
|---|---|---|---|
| 2,822,329 | 2/1958 | Griffith | 210/629 |
| 3,485,750 | 12/1969 | Albertson | 210/926 |
| 3,732,160 | 5/1973 | Klock | 210/903 |
| 3,817,857 | 6/1974 | Torpey | 210/903 |
| 3,846,292 | 11/1974 | LeCompte, Jr. | 210/926 |
| 4,278,547 | 7/1981 | Reid | 210/926 |
| 4,282,102 | 8/1981 | Rooney | 210/926 |
| 4,479,876 | 10/1984 | Fuchs | 210/903 |

FOREIGN PATENT DOCUMENTS 2738181 3/1978 Fed. Rep. of Germany .

Primary Examiner—Stanley S. Silverman
Assistant Examiner—Christopher Upton
Attorney, Agent, or Firm—Spensley Horn Jubas & Lubitz

[57] ABSTRACT

The sewage lagoon system has a first pond containing mechanically and biologically degrading dissolved and undissolved organic and anorganic pollutant matter, without a recirculation of the forming activated sludge. The first pond is connected to a nitrification lagoon. It contains vertical contact beds for gathering nitrobacteria, which are horizontally flown through. The flow and the introduction of air in the nitrification lagoon are effected by air-water pumps generating a directed flow and provide the transversal flow through the contact beds. The circulation rate in the nitrification lagoon is at least 10 times the throughflow rate.

8 Claims, 1 Drawing Sheet

SEWAGE LAGOON SYSTEM

BACKGROUND OF THE INVENTION

1. Field of the Invention

The invention relates to a sewage lagoon system.

2. Description of Related Act

Instead of sewage treatment plants that use either trickling filters or the activated sludge process, smaller communities in rural areas often use lagoon systems for the mechanical-biological purification of their waste water, which operate with less technical expenditure, but require a larger area per inhabitant. A sufficient dimensioning being provided, it is possible to degrade the solids and the dissolved and undissolved organic carbon compounds contained in domestic sewage by means of aerated lagoons. In order to further achieve a thorough oxidation of the nitrogen compounds present in the waste water, further measures are required. Nitrogen compounds are converted by hydrolysis into ammonium and, subsequently, to nitrate by oxidation. Ammonium is a nutrient for plants, it is poisonous to fish and consumes oxygen. The nitrification, i.e. the conversion of nitrogen compounds to nitrate, is effected with the help of bacteria, the so-called nitrobacteria. In contrast to those bacteria that degrade carbon compounds, nitrobacteria grow slowly so that the sludge needed for the nitrification has to be of a comparatively high age. If the nitrification and the degradation of the carbon compounds are effected at the same time, there is the problem that the nitrobacteria are covered by the fast-growing bacteria responsible for the degradation of the carbon compounds, the nitrobacteria thus being ineffective.

It is known in activated sludge plants to install contact beds in the activated sludge tank, in which a sludge layer gathers to form old sludge. Additionally, an aeration of the activated sludge tank is provided. Such purification systems are described, e.g., in German Laid Open Patent Application 29 01 509 and in German Laid Open Patent Application 33 27 774 A1. An activated sludge plant is a highly concentrated purification system with a low area demand per inhabitant and a high degree of technicalization. The activated sludge, or a part thereof, leaving the activated sludge tank is returned into the activated sludge tank via a sludge return path, so that old sludge may form therein. Sewage works with activated sludge tanks require considerable production and maintenance expenditures. In contrast thereto, other conditions prevail in simple sewage lagoon systems.

It is known from German Laid Open Patent Application 35 22 965 A1 to arrange contact beds swimming submerged in an aerated basin or lagoon filled with waste water. These contact beds serve for the gathering of sessile biomass. Flow occurs through the contact beds horizontally.

A lagoon system is known from German Laid Open Patent Application 36 10 181 A1. This known sewage lagoon system has a clarifying pond and an adjoining nitrification lagoon. The aeration in the nitrification lagoon is effected by a compressed air aeration device arranged on the bottom of the lagoon, above which guide walls are disposed that define a vertical shaft. The buoyancy flow caused in the shaft by the ascending air effects the formation of circulations in the nitrification lagoon and, at the same time, the aeration of the sewage. A contact bed is mounted in the shaft, through which flows the ascending mixture of air and water. In this sewage lagoon system, the degradation of dissolved and undissolved organic carbon compounds and the nitrification are separated, so that the nitrobacteria are not covered to a considerable extent by other microorganisms. When the waste water leaves the clarifying pond, it is already substantially free of carbon compounds, so that the activity of the bacteria is concentrated on the nitrification in the nitrification lagoon. However, it is disadvantageous that the aeration device requires a large constructional effort and high operating costs, and that the space available for the contact bed in the narrow shaft is very limited. Further, the flow rate of the circulating flow is very low, since this circulating flow is driven only by the ascending bubbles. The nitrification effect is comparatively low with a view to the energy consumption and to the high financial input.

It is an object of the invention to provide a sewage lagoon system with a high nitrification effect at low production and operating costs.

SUMMARY OF THE INVENTION

According to the invention, the aeration and the circulating flow of the waste water in the nitrification lagoon are performed by air-water pumps. Such air-water pumps are generally known in waste water technics. They are either propeller aspirator aerators that have a hollow shaft which is partially submerged into the waste water being provided with a spiral or a propeller, a flow jet that reaches deep into the waste water being generated and air being sucked through the hollow shaft, or they are jet aerators wherein a pump generates a jet of waste water that entrains air in a nozzle and introduces it into the waste water. In any case, air-water pumps simultaneously cause a directed waste water flow and an introduction of oxygen into the water. While the sewage in the nitrification lagoon is caused to circulate by means of such air-water pumps, the contact beds are arranged perpendicularly in the nitrification lagoon, so that the generated flow flows through the contact beds horizontally. Thus, a large cross sectional surface is flown through, which results in a comparatively low flow resistance. The circulation rate in the nitrification lagoon is at least 10 times the flow rate. In this way, a multiple circulation of the waste water alternately results in an enrichment with oxygen and a consumption of this oxygen by the active biomass on the contact beds. On the other hand, if the flow rate is predetermined, the circulation speed of the circulating flow is made correspondingly high in order to enhance the growth of the nitrobacteria and also to introduce a sufficiently large amount of oxygen into the waste water.

In the sewage lagoon system of the present invention, the functions of the first pond and the nitrification lagoon are clearly separated. The first pond may be aerated or not. It is important that dissolved and undissolved organic and anorganic contaminants are removed in the first pond by sedimentation and biological degradation, so that the activity of the nitrobacteria is not substantially impaired by other faster growing microorganisms in the nitrification lagoon. A rather fast circulation is maintained in the nitrification lagoon, whereas the throughflow is very slow compared thereto. The aeration of the nitrification lagoon is effected by air-water pumps that are advantageously mounted above the water level and only have to be partially immersed into the water and need not be under water.

The paths of the circulating flow in the nitrification lagoon are preferably separated from each other by a guide wall or an isle in order to avoid the formation of whirls and uncontrolled flow courses. The shape of the nitrification lagoon is generally of little or no importance. The lagoon may be rectangular or round or may be of any other shape.

It is also possible to have the flow through nitrification basin in only one direction and to provide a circulation channel in which the recirculation is effected.

BRIEF DESCRIPTION OF THE DRAWINGS

The following is a detailed description of embodiments of the invention with reference to the accompanying drawings.

In the Figures

DESCRIPTION OF THE PREFERRED EMBODIMENTS

Figure 1:
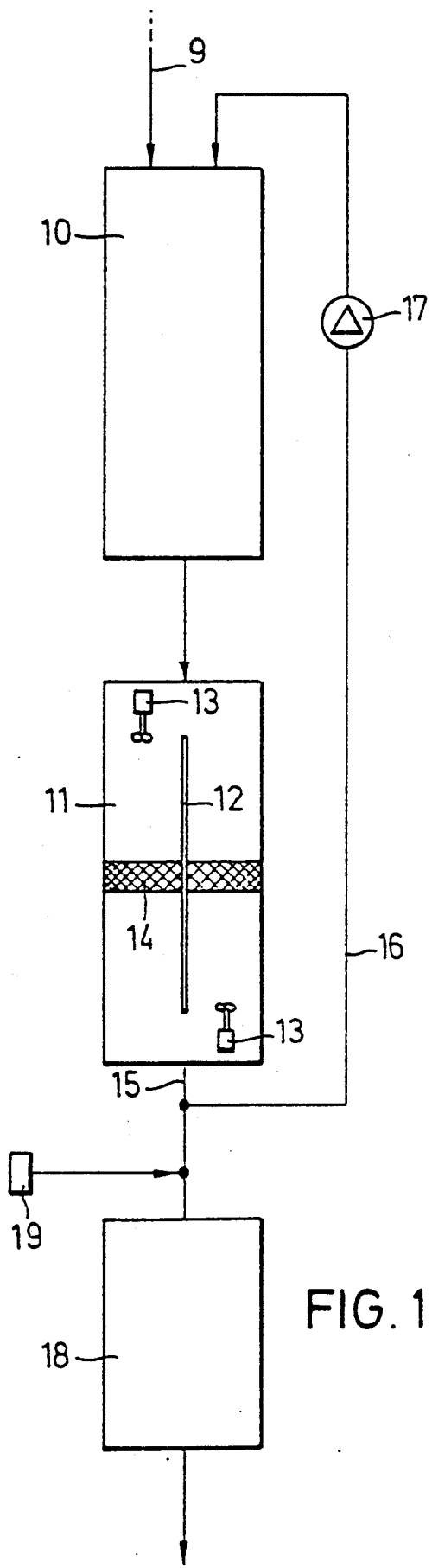
FIG. 1 is a schematic illustration of a sewage lagoon system.

The sewage lagoon system according to FIG. 1 is provided with a first pond 10 having a feed 9 through which the waste water is fed. Biological sludge forms on the walls and the bottom of the pond 10. Further devices (not illustrated) for enhancing the forming of the biological sludge may also be provided in the pond 10. The size of the first pond is preferably at least 0.5 to 1m$^3$ per inhabitant. It may be operated in a dam-up manner for the treatment of rain water. A recirculation of the biological sludge from the outlet of the pond 10 back to feed need not be provided.

The outlet of the pond 10 is connected with the feed of the adjoining nitrification lagoon 11. The size of the nitrification lagoon 11 roughly corresponds to that of the pond 10. According to FIG. 1, a longitudinally extending vertical guide wall 12 is provided in the nitrification lagoon 11, so that a circulating flow path is generated there. The fluid is driven along this flow path by means of air-water pumps 13 that immerge into the water from above and drive the water, while simultaneously introducing air into the water. In the present case, the pumps are depicted as propeller aerators.

At least one contact bed 14 in the form of a vertical assembly is provided in the nitrification lagoon 11, extending transversally to the guide wall 12 over the entire cross section of the flow. This contact bed 14 consists of a spatially netted supporting structure having a very large surface compared to its volume in order to enhance the gathering of biological sludge.

The flow flows through the contact bed horizontally in each of the flow paths provided on both sides of the guide wall 12.

The water leaves the nitrification lagoon 11 through the outlet 15. A slider may be provided at that outlet with which the discharge rate can be varied. The circulation rate in the nitrification lagoon 11 is at least 10 times the throughflow rate. This means that the water will on average flow ten times on the circulation path before it gets to the outlet 15. Preferably, the residue time in the nitrification lagoon is even longer, the circulation rate being at least 20 to 50 times, or even 100 times the throughflow rate.

In the illustrated embodiment, a recirculation channel 16 with a pump 17 leads from the outlet 15 of the nitrification lagoon 11 back to pond 10. A denitrification of nitrate is performed in the pond 10, i.e. a microbic reduction of nitrate to gaseous nitrogen. Up to 75% of the amount of the flow is branched into the recirculation channel 16 by the outlet 15. The remaining amount is fed into the polishing pond 18 from which it leaves purified. A device 19 for feeding a precipitant for phosphates is provided before the feed of the polishing pond 18.

Figure 2:
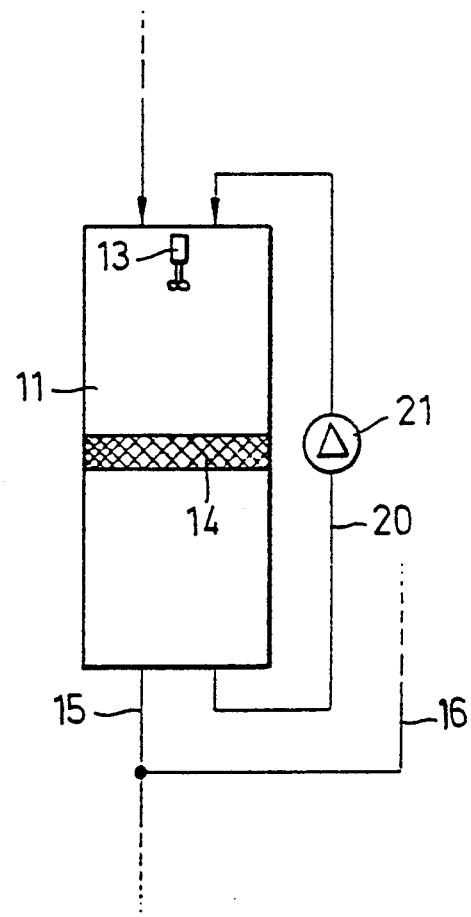
FIG. 2 is another embodiment of the nitrification lagoon in the sewage lagoon system of FIG. 1.

FIG. 2 illustrates a modified embodiment of the nitrification lagoon 11 having no guide wall or isle provided in the lagoon, but wherein the entire width of the lagoon is flown through in one direction. The recirculation necessary for the circulation of the flow is effected through the circulation channel 20 containing a pump 21. Air-water pumps 13, only one of which is shown in FIG. 2, provide for the aeration and the propulsion of the water in the nitrification lagoon 11. Also in the embodiment of FIG. 2, the recirculation channel 16 is provided. However, this recirculation channel may be omitted, if no denitrification is to be performed.

What is claimed is:

1. A method for treating sewage in a sewage lagoon system, comprising:
    sedimenting and biologically degrading dissolved and undissolved organic and inorganic pollutant matter, without recirculation of the forming activated sludge in a first pond
    nitrifying the sewage is at least one aerated nitrification lagoon in communication with the first pond, in which sewage is circulated at a circulation rate and having at least one contact bed through which the circulation flows,
    wherein
    the first pond comprises an earth pond having sludge therein that enables substantially rapid growth of carbon-degrading bacteria,
    the aeration and the circulation in the nitrification lagoon are effected by air-water pumps that generate a directed flow and that accelerate the sewage with a horizontal component, thereby producing a substantially horizontal jet stream of sewage while introducing air into the sewage,
    each contact bed is arranged in the nitrification lagoon so as to be substantially horizontally flown through, and
    the circulation rate in the nitrification lagoon is at least 10 times the rate at which sewage flows through the lagoon,
    whereby carbon compounds are degraded in the first pond and waste water entering the nitrification lagoon from the first pond comprises a relatively small amount of carbon compounds and a relatively high amount of nitrogen compounds.

2. The method according to claim 1, wherein the nitrification lagoon has a centrally arranged guide structure around which the sewage circulates.

3. The method according to claim 1, wherein the nitrification lagoon includes an outlet and a feed and wherein the outlet of the nitrification lagoon is connected with the feed via a circulation channel.

4. The method according to claim 1, wherein the nitrification lagoon includes an outlet and wherein a recirculation channel leads from the outlet of the nitrification lagoon to the first pond.

5. A method for treating sewage in a sewage lagoon system, comprising:
sedimenting and biologically degrading dissolved and undissolved organic and inorganic pollutant matter, the pond comprising an earth pond having sludge therein that enables substantially rapid growth of carbon-degrading bacteria,
nitrifying the sewage at a throughflow rate in a nitrification lagoon in communication with the pond,
wherein said nitrification lagoon comprises a contact bed arranged in the nitrification lagoon,
an air-water pump for aerating and circulating sewage in the nitrification lagoon at a circulation rate and for generating a directed flow of sewage substantially horizontally through the contact bed, thereby producing a substantially horizontal jet stream of sewage while introducing air into the sewage,
wherein the circulation rate is at least ten times greater than the throughflow rate,
whereby carbon compounds are degraded in the pond and waste water entering the nitrification lagoon from the pond comprises a relatively small amount of carbon compounds and a relatively high amount of nitrogen compounds.

6. The method according to claim 5, comprising:
a guide structure substantially centrally disposed in the nitrification lagoon, whereby the sewage circulates around the guide structure.

7. The method according to claim 5, wherein the nitrification lagoon includes an outlet and a feed and comprising a circulation channel connecting the outlet and the feed.

8. The method according to claim 5, wherein the nitrification lagoon includes an outlet and comprising a recirculation channel connecting the outlet and the pond.

* * * * *